United States Patent
Hata

(10) Patent No.: US 9,598,073 B2
(45) Date of Patent: Mar. 21, 2017

(54) CONTROLLER FOR VEHICLE

(71) Applicant: MITSUBISHI JIDOSHA KOGYO KABUSHIKI KAISHA, Tokyo (JP)

(72) Inventor: Koji Hata, Okazaki (JP)

(73) Assignee: Mitsubishi Jidosha Koygo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/769,742

(22) PCT Filed: Dec. 24, 2013

(86) PCT No.: PCT/JP2013/084483
§ 371 (c)(1),
(2) Date: Aug. 21, 2015

(87) PCT Pub. No.: WO2014/132539
PCT Pub. Date: Sep. 4, 2014

(65) Prior Publication Data
US 2016/0251011 A1    Sep. 1, 2016

(30) Foreign Application Priority Data
Mar. 1, 2013    (JP) ................................. 2013-040929

(51) Int. Cl.
*B60W 20/13*    (2016.01)
*B60W 10/06*    (2006.01)
(Continued)

(52) U.S. Cl.
CPC ............. *B60W 20/13* (2016.01); *B60K 6/485* (2013.01); *B60L 1/00* (2013.01); *B60W 10/06* (2013.01);
(Continued)

(58) Field of Classification Search
CPC ...... B60W 20/13; B60W 10/08; B60W 10/06; B60W 2710/06; B60W 2710/08;
(Continued)

(56) References Cited

FOREIGN PATENT DOCUMENTS

EP    0 698 520 A1    2/1996
EP    0 800 947 A2    10/1997
(Continued)

*Primary Examiner* — Brian P Sweeney
(74) *Attorney, Agent, or Firm* — Birch, Stewart, Kolasch & Birch, LLP

(57) ABSTRACT

According to the present invention, if a required power generation signal is supplied while a vehicle is decelerated in a fuel-efficiency-oriented control mode, an electrically-operated waste gate valve is operated so that opening of the electrically-operated waste gate valve is increased as the required power generation amount increases. Then, if it is determined that the vehicle is decelerated on the basis of accelerator opening and a vehicle speed, and fuel is cut off, an electronically controlled throttle valve is operated toward a fully opened side. In addition, if any one of following conditions is satisfied: the fuel-efficiency-oriented control mode is not selected; there is supply of a required output signal; and the vehicle is not decelerated, opening of the electrically-operated waste gate valve is adjusted so that output torque of an engine becomes a required output value.

20 Claims, 3 Drawing Sheets

(51) Int. Cl.
| | |
|---|---|
| *B60W 10/08* | (2006.01) |
| *B60L 1/00* | (2006.01) |
| *F02B 37/12* | (2006.01) |
| *F02B 37/18* | (2006.01) |
| *B60K 6/485* | (2007.10) |
| *B60W 20/00* | (2016.01) |
| *F02D 41/02* | (2006.01) |
| *F02D 41/04* | (2006.01) |
| *F02D 41/00* | (2006.01) |
| *F02D 41/12* | (2006.01) |
| *B60K 6/26* | (2007.10) |

(52) U.S. Cl.
CPC ............ *B60W 10/08* (2013.01); *B60W 20/00* (2013.01); *F02B 37/12* (2013.01); *F02B 37/18* (2013.01); *F02D 41/0005* (2013.01); *F02D 41/0007* (2013.01); *F02D 41/021* (2013.01); *F02D 41/045* (2013.01); *B60K 6/26* (2013.01); *B60W 2510/085* (2013.01); *B60W 2510/244* (2013.01); *B60W 2710/06* (2013.01); *B60W 2710/08* (2013.01); *B60Y 2200/92* (2013.01); *B60Y 2300/60* (2013.01); *B60Y 2300/91* (2013.01); *F02D 41/123* (2013.01); *F02D 2200/0404* (2013.01); *F02D 2200/503* (2013.01); *Y02T 10/144* (2013.01); *Y02T 10/42* (2013.01); *Y02T 10/6226* (2013.01); *Y10S 903/906* (2013.01)

(58) Field of Classification Search
CPC ........... B60W 20/00; B60W 2510/244; B60W 2510/085; B60L 1/00; B60K 6/26; B60K 6/485; B60Y 2200/92; B60Y 2300/60; B60Y 2300/91; Y10S 903/906; F02D 41/021; F02D 41/045; F02D 41/0005; F02D 41/0007; F02D 2200/0404; F02D 41/123; F02D 2200/503; F02B 37/12; F02B 37/18; Y02T 10/6226; Y02T 10/144; Y02T 10/42
USPC .......................................................... 701/22
See application file for complete search history.

(56) References Cited

FOREIGN PATENT DOCUMENTS

| | | | | |
|---|---|---|---|---|
| EP | 0 904 971 A1 | | 3/1999 | |
| JP | 2004-092455 A | * | 3/2004 | .......... Y02T 1/6286 |
| JP | 2004-92455 A | | 3/2004 | |
| JP | 2005-9314 A | | 1/2005 | |
| JP | 2006-090150 A | * | 4/2006 | .......... Y02T 10/144 |
| JP | 2006-90150 A | | 4/2006 | |
| JP | 2006-220045 A | | 8/2006 | |
| JP | 2010-7674 A | | 1/2010 | |
| JP | 2011-80398 A | | 4/2011 | |
| JP | 2011-144716 A | | 7/2011 | |

* cited by examiner

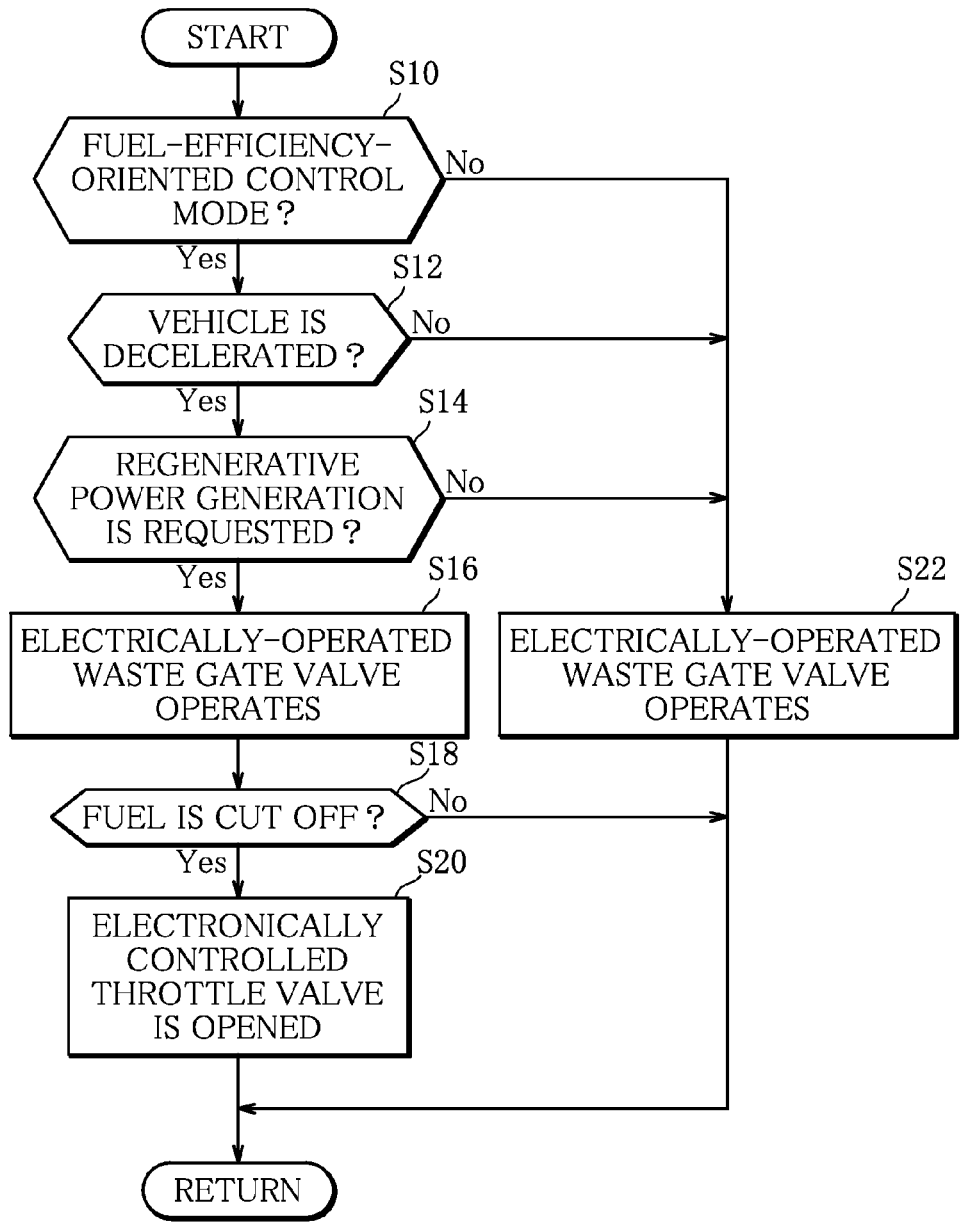

CONTROLLER FOR VEHICLE

TECHNICAL FIELD

The present invention relates to a controller for a vehicle, and more particularly to operation control of a waste gate valve of an internal combustion engine.

BACKGROUND ART

Heretofore, an internal combustion engine of a vehicle is provided with a generator that is driven by an output shaft of the internal combustion engine, and that supplies electric power to electric components of the vehicle, electric control components of the internal combustion engine, and the like. The generator also supplies electric power to a battery mounted on the vehicle to charge the battery.

For example, while the vehicle is running, if the generator generates electric power not only for supplying electric power to the electric components of the vehicle, the electric control components of the internal combustion engine, and the like, but also for charging the battery, the internal combustion engine is required to generate not only power for running the vehicle, but also power for driving the generator.

However, generating power not only for running the vehicle but also for driving the generator causes fuel efficiency of the internal combustion engine to be deteriorated.

Thus, in Patent Document 1, a generator is controlled so that a power generation amount of the generator during deceleration of the vehicle is more than that during steady-state running and acceleration of the vehicle, or deceleration regenerative control is performed. Thus the generator is driven by kinetic energy of the vehicle to reduce fuel consumption of the internal combustion engine during steady-state running and acceleration of the vehicle.

PRIOR ART DOCUMENT

Patent Document

Patent Document 1: Japanese Patent Laid-Open No. 2011-144716

SUMMARY OF THE INVENTION

Problems to be Solved by the Invention

During deceleration of a vehicle, braking caused by pumping loss and rotational resistance of an internal combustion engine, or braking force of the engine brake, consumes kinetic energy of the vehicle and decelerates the vehicle.

In a power generation controller of Patent Document 1 described above, the deceleration regenerative control of the generator is performed so that the power generation amount of the generator during deceleration of the vehicle is more than that during steady-state running and acceleration of the vehicle.

Some internal combustion engines are provided with a turbocharger in which exhaust gas is injected into a turbine to drive a compressor provided coaxially with the turbine in order to supercharge intake air by the compressor.

In such an internal combustion engine provided with a turbocharger, a bypass valve in a bypass passage bypassing the turbine of the turbocharger is closed during deceleration of a vehicle, so that exhaust gas discharged from a combustion chamber of the internal combustion engine is injected into a turbine housing of the turbocharger. Then, in a turbine nozzle portion of the turbine housing, a cross-sectional area of an exhaust passage is reduced, so that pressure of the exhaust gas discharged from the internal combustion engine, or exhaust pressure rises. As a result, exhaust resistance rises to increase pumping loss of the internal combustion engine.

If the control of a generator of Patent Document 1 is applied to such an internal combustion engine provided with a turbocharger, kinetic energy of a vehicle is consumed by braking force caused by engine brake and force for driving the generator. As a result, the kinetic energy of the vehicle is rapidly consumed and the vehicle decelerates rapidly, which deteriorates drivability. In addition, the kinetic energy of the vehicle lacks, so that the generator cannot be sufficiently driven. That may lead to decrease of a power generation amount of the generator and the like, which is not preferable.

The present invention has been made to solve the problem described above, and an object of the present invention is to provide a controller for a vehicle, capable of reliably generating electric power during deceleration of the vehicle.

Means for Solving the Problems

In order to achieve the object above, a controller for a vehicle according to the present invention comprises: an internal combustion engine that is mounted on the vehicle and that includes a turbine provided in an exhaust passage; a waste gate valve that is provided in a bypass passage bypassing the turbine to adjust a flow rate of exhaust gas flowing into the bypass passage; a rotary electric machine that performs regenerative power generation by using turning force of an axle shaft of the vehicle; a battery that stores electric power generated by the rotary electric machine; a regenerative power generation amount calculation unit that calculates a regenerative power generation amount of the rotary electric machine in response to a running state of the vehicle and an amount of charge of the battery; and a first operation control unit that controls operation of the waste gate valve in response to the regenerative power generation amount.

Advantageous Effects of the Invention

According to the present invention, operation of the waste gate valve is controlled in response to the regenerative power generation amount.

Specifically, when the rotary electric machine performs the regenerative power generation, the waste gate valve is allowed to operate toward its open side to allow exhaust gas discharged from the internal combustion engine to flow downstream of the turbine through the bypass passage. As a result, a flow rate of exhaust gas injected into the turbine is reduced, so that it is possible to reduce pressure of the exhaust gas discharged from the internal combustion engine, or exhaust pressure.

Thus, as the exhaust pressure is reduced, it is possible to reduce pumping loss and to reduce braking caused by rotational resistance of the internal combustion engine, or braking force caused by engine brake. As a result, it is possible to reduce consumption of kinetic energy of the vehicle, by the braking force caused by the engine brake.

Accordingly, since the kinetic energy of the vehicle can be used for driving the rotary electric machine, it is possible to reliably perform the regenerative power generation by using the rotary electric machine while decelerating the vehicle through consumption of its kinetic energy by driving the rotary electric machine.

BRIEF DESCRIPTION OF THE DRAWINGS

FIG. 3 is a flow chart showing a control routine of valve operation control of an electrically-operated waste gate valve in accordance with the present invention.

MODE FOR CARRYING OUT THE INVENTION

Hereinafter, an embodiment of the present invention will be described on the basis of the accompanying drawings.

Figure 1:
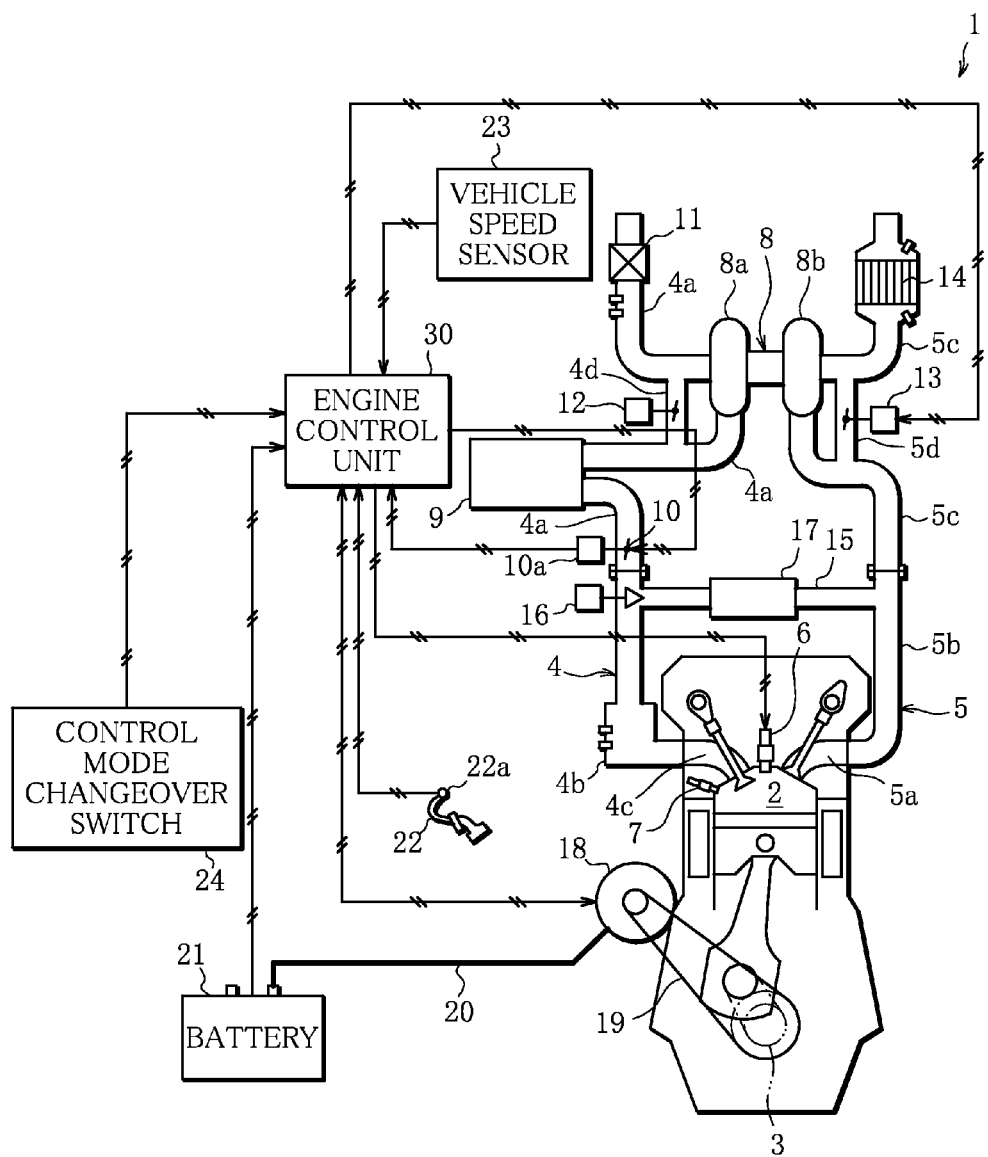
FIG. 1 is a schematic diagram of an engine to which a controller for a vehicle in accordance with the present invention is applied.
Figure 2:
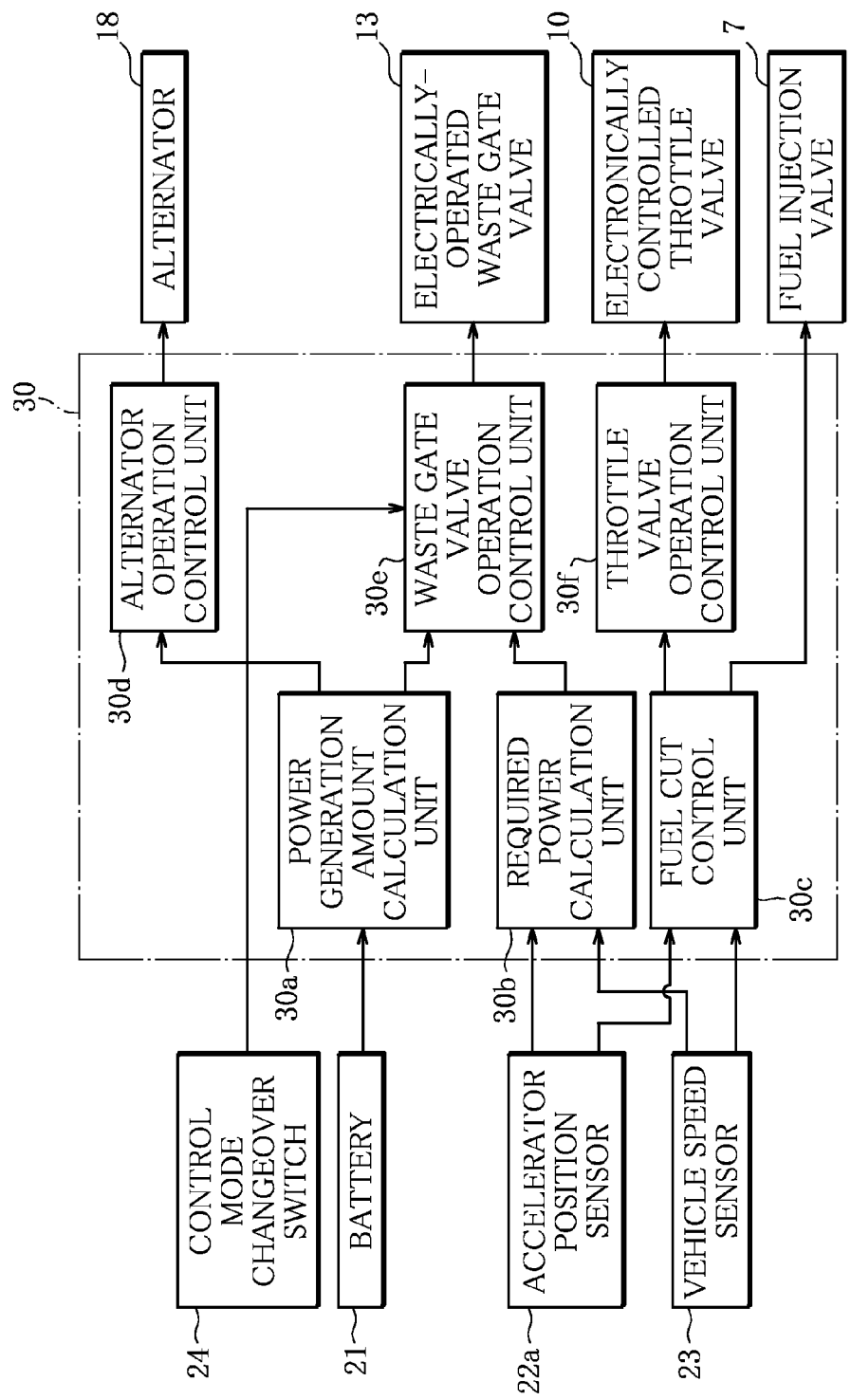
FIG. 2 is a block diagram showing an internal configuration of an engine control unit in the controller for a vehicle in accordance with the present invention.

FIG. 1 is a schematic diagram of an engine 1 to which the controller for a vehicle is applied. A thick solid line in FIG. 1 shows an electric power supply wiring 20 through which electric power is supplied from an alternator 18 to a battery 21. In addition, FIG. 2 is a block diagram showing an internal configuration of an engine control unit 30 in the controller for a vehicle.

As shown in FIG. 1, the engine (internal combustion engine) 1 is a multi-cylinder direct-injection gasoline engine mounted on a vehicle (not shown), and that specifically has a structure in which fuel is supplied to a fuel injection valve (fuel supply unit) 7 of each of cylinders and the fuel injection valve 7 can inject the fuel into a combustion chamber 2 of each of the cylinders at any timing and amount. As shown in FIG. 1, the engine 1 is provided with the combustion chamber 2. In addition, the engine 1 is provided with an intake passage 4 composed of an intake pipe 4a through which air is injected into the combustion chamber 2, an intake manifold 4b, and an intake port 4c so that the intake passage 4 communicates with the combustion chamber 2. Further, the engine 1 is provided with an exhaust passage 5 composed of an exhaust port 5a through which exhaust gas is discharged from the combustion chamber 2, an exhaust manifold 5b, and an exhaust pipe 5c so that exhaust passage 5 communicates with the combustion chamber 2. Furthermore, the engine 1 is provided with an ignition plug 6 that is arranged so as to face the combustion chamber 2 to ignite a gaseous mixture of the fuel and the air injected into the combustion chamber 2, and with a fuel injection valve 7 that supplies the fuel into the combustion chamber 2.

In the intake passage 4 of the engine 1, a compressor housing 8a of a turbocharger 8 is provided so as to communicate with the intake passage 4. In the intake passage 4 between the compressor housing 8a of the turbocharger 8 and the combustion chamber 2 of the engine 1, an intercooler 9 and an electronically controlled throttle valve (intake air amount adjusting unit) 10 are provided in order from the compressor housing 8a of the turbocharger 8. In addition, most upstream of the intake passage 4 of the engine 1, an air cleaner 11 is provided. Further, in the intake passage 4 of the engine 1, a bypass passage 4d including a bypass valve 12 is provided so as to allow an upstream side of the compressor housing 8a of the turbocharger 8 and a downstream side of the compressor housing 8a to communicate with each other.

In the exhaust passage 5 of the engine 1, a turbine housing 8b of the turbocharger 8 (corresponding to the turbine of the present invention) is provided so as to communicate with the exhaust passage 5. In addition, in the exhaust passage 5 of the engine 1, a bypass passage (corresponding to the bypass passage of the present invention) 5d is provided so as to allow an upstream side of the turbine housing 8b of the turbocharger 8 and a downstream side of the turbine housing 8b to communicate with each other. In the bypass passage 5d, an electrically-operated waste gate valve (waste gate valve) 13 is provided. Further, the exhaust passage 5 provided downstream of the turbine housing 8b of the turbocharger 8 includes a three way catalyst 14 having a function of cleaning up CO, HC, and NOx in exhaust gas.

The turbocharger 8 is configured to rotate its turbine by using exhaust gas injected through the turbine housing 8b to compress intake air injected through the air cleaner 11 by using a compressor provided coaxially with the turbine.

The intercooler 9 cools intake air at a high temperature caused by being compressed by the compressor of the turbocharger 8.

An electronically controlled throttle valve 10 adjusts the amount of intake air to be injected into the combustion chamber 2. The electronically controlled throttle valve 10 includes a throttle position sensor 10a that detects opening of the throttle valve.

The air cleaner 11 removes contaminations in intake air inhaled from most upstream.

The bypass valve 12 adjusts the amount of the intake air compressed by the compressor of the turbocharger 8 which is returned to upstream of the compressor housing 8a through the bypass passage 4d.

The electrically-operated waste gate valve 13 adjusts a flow rate of exhaust gas flowing into the bypass passage 5d by operating a butterfly valve using power of a motor or the like, that is, the electrically-operated waste gate valve 13 adjusts pressure and a flow rate of intake air to be compressed by the compressor of the turbocharger 8 through by adjusting a flow rate of exhaust gas flowing into the turbine housing 8b of the turbocharger 8. In addition, the electrically-operated waste gate valve 13 includes a position sensor that detects opening of the waste gate valve.

In the intake manifold 4b and the exhaust manifold 5b, an exhaust gas recirculation passage 15 that returns a part of exhaust gas to an intake side, or recirculates exhaust gas to the intake side, is provided so as to allow the manifolds to communicate with each other. The exhaust gas recirculation passage 15 is connected to an upstream portion of the intake manifold 4b through an exhaust gas recirculation valve 16 that adjusts the amount of exhaust gas returning to the intake side, or a flow rate of exhaust gas to be recirculated. In addition, the exhaust gas recirculation passage 15 is provided with an exhaust gas recirculation cooler 17 that cools exhaust gas to be injected into the intake manifold 4b.

The engine 1 is provided with an alternator (rotary electric machine) 18.

The alternator 18 is connected to a crankshaft 3 of the engine 1 through an accessory drive belt 19. In addition, the alternator 18 is electrically connected to the battery (battery) 21 storing electric power, through the electric power supply wiring 20. The alternator 18 generates electric power by being driven by the crankshaft 3 to supply the electric power to electrical components of the vehicle, such as a headlight and a windshield wiper, electronic control components of the engine 1, such as the electronically controlled throttle valve 10 and the electrically-operated waste gate valve 13, and the battery 21. Since the crankshaft 3 is connected to an axle shaft, that turns wheels of the vehicle, through a transmission, the alternator 18 is capable of power generation (regenerative power generation) also by using turning force of the axle shaft of the vehicle. A power generation amount of the alternator 18 is controlled by the engine control unit 30.

The engine control unit 30 is a controller for performing overall control of the vehicle, including operation control of the engine 1, and includes an input-output device, a storage device (such as a ROM, a RAM, and a nonvolatile RAM), a central processing unit (CPU), and the like.

Various sensors and devices are electrically connected to an input side of the engine control unit 30. Sensors include an accelerator position sensor (accelerator opening detection unit) 22$a$ detecting accelerator opening that is a manipulated variable of an accelerator pedal 22, a vehicle speed sensor 23 detecting a speed of the vehicle, and a crank angle sensor (not shown) and the like. Devices include the bypass valve 12, the electrically-operated waste gate valve 13, exhaust gas recirculation valve 16, the alternator 18, the battery 21, and a control mode changeover switch 24 that switches a control mode of the vehicle. Accordingly, information detected by the sensors above is inputted into the engine control unit 30.

The control mode changeover switch 24 switches the control mode (such as operation control of the engine 1 and gear change control of a transmission (not shown)) of the vehicle to a fuel-efficiency-oriented control mode in which fuel efficiency is emphasized or a driving-oriented control mode in which acceleration performance (kinematic performance) of the vehicle is emphasized. The control mode changeover switch 24 of the present invention is not limited to a switch, and can be anything capable of switching the control mode.

On the other hand, on an output side of the engine control unit 30, there are electrically connected various devices described above such as the ignition plug 6, the fuel injection valve 7, the electronically controlled throttle valve 10, the bypass valve 12, the electrically-operated waste gate valve 13, the exhaust gas recirculation valve 16, and the alternator 18. The various devices above receive respective information pieces calculated on the basis of information detected by the various sensors, such as ignition timing, the amount of fuel injection, fuel injection timing, throttle opening, bypass valve opening, waste gate valve opening, exhaust gas recirculation valve opening, and a required power generation amount.

As shown in FIG. 2, the engine control unit 30 is composed of a power generation amount calculation unit (regenerative power generation amount calculation unit) 30$a$, a required output calculation unit 30$b$, a fuel cut control unit (second operation control unit) 30$c$, an alternator operation control unit 30$d$, a waste gate valve operation control unit (first operation control unit) 30$e$, and a throttle valve operation control unit (second operation control unit) 30$f$.

The power generation amount calculation unit 30$a$ detects an amount of charge of the battery 21 and calculates a power generation amount to be generated by the alternator 18, or the required power generation amount that is a demand power for the alternator 18, on the basis of the amount of charge of the battery 21. The required power generation amount is calculated so as to be increased as the amount of charge of the battery 21 decreases. If the required power generation amount is more than 0 (zero), the power generation amount calculation unit 30$a$ supplies the required power generation amount to the alternator operation control unit 30$d$ and the waste gate valve operation control unit 30$e$, as a required power generation signal. If the required power generation amount is 0 (zero), it means that there is no power generation request. Thus, supply of a required power generation signal to the alternator operation control unit 30$d$ and the waste gate valve operation control unit 30$e$ is stopped. In the present embodiment, if the required power generation amount is 0 (zero), supply of a required power generation signal from the power generation amount calculation unit 30$a$ is stopped, however, a required power generation amount of 0 (zero) may be supplied as the required power generation signal.

The required output calculation unit 30$b$ calculates output torque to be generated by the engine 1, or a required output value that is an output value to be required to the engine 1, on the basis of accelerator opening detected by the accelerator position sensor 22$a$ and a vehicle speed detected by the vehicle speed sensor 23. If the required output value is more than 0 (zero), the required output calculation unit 30$b$ supplies the required output value to the waste gate valve operation control unit 30$e$, as a required output signal. If the required output value is 0 (zero), it means that there is no output request. Thus, the required output calculation unit 30$b$ stops supplying a required output signal to the waste gate valve operation control unit 30$e$. The required output calculation unit 30$b$ calculates a required output value of 0 (zero) if accelerator opening is 0 (zero) and a speed of the vehicle decreases, for example, because the vehicle is decelerated so that the engine 1 is not required to generate positive output torque (output torque for running the vehicle). In the present embodiment, if the required output value is 0 (zero), supply of a required output signal from the required output calculation unit 30$b$ is stopped, however, a required output value of 0 (zero) may be supplied as the required output signal.

The fuel cut control unit 30$c$ controls operation of the fuel injection valve 7 so as to stop fuel supply, or cut off fuel when it is determined that the vehicle is in a deceleration state on the basis of accelerator opening detected by the accelerator position sensor 22$a$ and the vehicle speed detected by the vehicle speed sensor 23. In addition, the fuel cut control unit 30$c$ supplies a fuel cut signal to the throttle valve operation control unit 30$f$ when starting fuel cut.

The alternator operation control unit 30$d$ controls operation of the alternator 18 on the basis of a required power generation amount so that a power generation, amount of the alternator 18 becomes the required power generation amount.

The waste gate valve operation control unit 30$e$ controls opening of the electrically-operated waste gate valve 13 on the basis of a required power generation amount, a required output value, and a control mode of the vehicle selected by the control mode changeover switch 24.

The throttle valve operation control unit 30$f$ controls operation of the electronically controlled throttle valve 10 so that the electronically controlled throttle valve 10 is fully opened when a fuel cut signal is supplied.

The engine control unit 30 performs valve operation control of the electrically-operated waste gate valve 13 to allow the electrically-operated waste gate valve 13 to operate toward an open side so that opening of the electrically-operated waste gate valve 13 is increased as a power generation amount (corresponding to the regenerative power generation amount of the present invention) of the alternator 18 increases when it is determined that a vehicle is in a deceleration state and the battery 21 is required to be charged on the basis of an amount of charge of the battery 21, accelerator opening detected by the accelerator position sensor 22a, the vehicle speed detected by the vehicle speed sensor 23, and a control mode of the vehicle selected by the control mode changeover switch 24.

Hereinafter, valve operation control of the electrically-operated waste gate valve 13 performed in the engine control unit 30 of the engine 1 to which the controller for a vehicle, configured as above, in accordance with the present invention is applied, will be described.

FIG. 3 is a flow chart showing a control routine of the valve operation control of the electrically-operated waste gate valve in accordance with the present invention.

As shown in FIG. 3, in step S10, it is determined whether a control mode is the fuel-efficiency-oriented control mode or not. Specifically, the waste gate valve operation control unit 30e determines whether the fuel-efficiency-oriented control mode in which fuel efficiency is emphasized is selected for the control mode of the vehicle by using the control mode changeover switch 24. If the determination result is true (Yes), that is, the fuel-efficiency-oriented control mode in which fuel efficiency is emphasized is selected for the control mode of the vehicle by using the control mode changeover switch 24, processing proceeds to step S12. Conversely, if the determination result is false (No), that is, the fuel-efficiency-oriented control mode in which fuel efficiency is emphasized is not selected for the control mode of the vehicle by using the control mode changeover switch 24 and the driving-oriented control mode in which acceleration performance (kinematic performance) of the vehicle is emphasized is selected, the processing proceeds to step S22.

In step S12, it is determined whether the vehicle is decelerated or not. Specifically, the waste gate valve operation control unit 30e determines whether there is no supply of a required output signal from the required output calculation unit 30b, that is, the vehicle is decelerated, or not. If the determination result is true (Yes), that is, there is no supply of a required output signal from the required output calculation unit 30b, or the vehicle is decelerated, the processing proceeds to step S14. Conversely, if the determination result is false (No), that is, there is supply of a required output signal from the required output calculation unit 30b, or the vehicle is not decelerated, the processing proceeds to step S22. In the present embodiment, although deceleration of the vehicle is determined by whether there is supply of a required output signal to the waste gate valve operation control unit 30e from the required output calculation unit 30b, or not, for example, the waste gate valve operation control unit 30e may determine deceleration of the vehicle by determining whether the required output value is 0 (zero) or not, or by using any one of vehicle speed and accelerator opening, or both of the vehicle speed and the accelerator opening, as another way.

In step S14, it is determined whether there is a request for regenerative power generation or not. Specifically, the waste gate valve operation control unit 30e determines whether a required power generation signal is supplied from the power generation amount calculation unit 30a so that the alternator 18 is driven by using kinetic energy of the vehicle so that power generation (corresponding to the regenerative power generation of the present invention) is performed by the alternator 18 while the vehicle is decelerated, or not, that is, whether regenerative power generation control for performing the power generation by using the kinetic energy of the vehicle is performed or not. If the determination result is true (Yes), that is, the required power generation signal is supplied from the power generation amount calculation unit 30a so that the alternator 18 is driven by using kinetic energy of the vehicle while the vehicle is decelerated to perform the power generation in the alternator 18, it is determined that there is a request for the regenerative power generation, and then the processing proceeds to step S16. Conversely, if the determination result is false (No), that is, the required power generation signal is not supplied from the power generation amount calculation unit 30a, it is determined that there is no request for the regenerative power generation, and then the processing proceeds to step S22. In the present embodiment, the presence or absence of the request for regenerative power generation is determined, as an example, by the presence or absence of supply of the required power generation signal to the waste gate valve operation control unit 30e from the power generation amount calculation unit 30a. However, the presence or absence of the request for regenerative power generation may be determined by whether a required power generation amount is 0 (zero) or not.

In step S16, the electrically-operated waste gate valve 13 is opened. Specifically, the waste gate valve operation control unit 30e controls the electrically-operated waste gate valve 13 so as to operate toward the open side so that the alternator 18 is driven by using kinetic energy of the vehicle to generate a required power generation amount calculated by the power generation amount calculation unit 30a. The electrically-operated waste gate valve 13 is operated so that its opening is increased as the required power generation amount increases. That is, the electrically-operated waste gate valve 13 is operated toward the open side in response to a required power generation amount to reduce consumption of the kinetic energy, due to pumping loss of the engine 1, and then the processing proceeds to step S18.

In step S18, it is determined whether fuel is cut off, or not. Specifically, the throttle valve operation control unit 30f determines whether the fuel cut control unit 30c determines that the vehicle is decelerated, on the basis of accelerator opening and the vehicle speed, to stop operation of the fuel injection valve 7 to stop fuel supply to the combustion chamber 2, or not. If the determination result is true (Yes), that is, it is determined that the vehicle is decelerated, on the basis of the accelerator opening and the vehicle speed, so that fuel is cut off, the processing proceeds to step S20. Conversely, if the determination result is false (No), that is, the fuel is not cut off, the present routine is returned.

In step S20, the electronically controlled throttle valve 10 is opened. Specifically, the throttle valve operation control unit 30f controls the electronically controlled throttle valve 10 so as to operate toward a fully opened side to reduce pumping loss of the engine 1 due to increase in intake vacuum and then the present routine is returned. The electronically controlled throttle valve 10 is not required to be fully opened, if the pumping loss of the engine 1 can be reduced at another opening.

In step S22, the electrically-operated waste gate valve 13 is operated. Specifically, the waste gate valve operation control unit 30e controls operation of the electrically-operated waste gate valve 13 so that output torque of the engine 1 becomes the required output value calculated by the required output calculation unit 30b, and then the present routine is returned. Unlike in step S16, operation control of the electrically-operated waste gate valve 13 in step S22 is performed in order to adjust opening of the electrically-operated waste gate valve 13 so that the output torque of the engine 1 becomes the required output value. Thus, the electrically-operated waste gate valve 13 may be operated toward the open side or the closed side depending on the output torque of the engine 1 and the required output value.

As described above, in the controller for a vehicle, in accordance with the present invention, if following conditions are satisfied: the fuel-efficiency-oriented control mode in which fuel efficiency is emphasized is selected for the control mode of the vehicle; there is no supply of a required output signal from the required output calculation unit 30b, or the vehicle is decelerated; and the power generation amount calculation unit 30a supplies a required power generation signal to the waste gate valve operation control unit 30e to allow the alternator 18 to be driven by using kinetic energy of the vehicle so that power generation (regenerative power generation) is performed by the alternator 18 while the vehicle is decelerated, the alternator 18 is driven by using the kinetic energy produced by the vehicle and the waste gate valve operation control unit 30e allows the electrically-operated waste gate valve 13 to open so that opening of the electrically-operated waste gate valve 13 is increased as the required power generation amount calculated by the power generation amount calculation unit 30a increases. Then, if the fuel cut control unit 30c determines that the vehicle is decelerated on the basis of accelerator opening and a vehicle speed so that fuel is cut off, the throttle valve operation control unit 30f allows the electronically controlled throttle valve 10 to operate toward the fully opened side to reduce pumping loss of the engine 1 due to increase in intake vacuum. Conversely, if any one of following conditions is satisfied: the fuel-efficiency-oriented control mode in which fuel efficiency is emphasized is not selected for the control mode of the vehicle; there is supply of a required output signal from the required output calculation unit 30b; and the vehicle is not decelerated, opening of the electrically-operated waste gate valve 13 is adjusted so that the output torque of the engine 1 becomes the required output value calculated by the required output calculation unit 30b.

Thus, since the electrically-operated waste gate valve 13 is operated toward the open side in response to the required power generation amount regardless of the required output value, it is possible to allow exhaust gas discharged from the engine 1 to flow downstream of the turbine housing 8b of the turbocharger 8 through the bypass passage 5d. As a result, it is possible to reduce a flow rate of exhaust gas to be injected into the turbine housing 8b of the turbocharger 8, so that pressure of exhaust gas to be discharged from the engine 1, or exhaust pressure, can be reduced.

Thus, as the exhaust pressure is reduced, it is possible to reduce the pumping loss to reduce the braking caused by the rotational resistance of the engine 1, or the braking force caused by engine brake, so that it is possible to reduce consumption of the kinetic energy of the vehicle, by the braking force caused by the engine brake. As a result, it is possible to reliably perform power generation by the alternator 18 while the kinetic energy of the vehicle is consumed by driving the alternator 18 so that the vehicle is decelerated.

In addition, as the amount of charge of the battery 21 decreases, the required power generation amount is increased so that the power generation amount of the alternator 18 is increased. Further, the electrically-operated waste gate valve 13 is operated so that opening of the electrically-operated waste gate valve 13 is increased as the required power generation amount increases. That is, the electrically-operated waste gate valve 13 is operated so that the opening of the electrically-operated waste gate valve 13 is reduced as the required power generation amount decreases.

Thus, in a case where the battery 21 has a sufficient amount of charge, and the power generation amount of the alternator 18 is small, as well as consumption of the kinetic energy of the vehicle by driving the alternator 18 is small, it is possible to increase braking force caused by engine brake by reducing opening of the electrically-operated waste gate valve 13. Conversely, in a case where the amount of charge of the battery 21 lacks, and the power generation amount of the alternator 18 is large, as well as consumption of the kinetic energy of the vehicle, by driving the alternator 18 is large, it is possible to reduce the braking force caused by the engine brake by increasing the opening of the electrically-operated waste gate valve 13.

As a result, it is possible to hold deceleration feel of the vehicle constant regardless of the power generation amount of the alternator 18.

In addition, when a deceleration state of the vehicle is detected, supply of fuel to the combustion chamber 2 from the fuel injection valve 7 is stopped, as well as the electronically controlled throttle valve 10 is operated so that opening thereof is set on the fully opened side. As a result, when supply of the fuel from the fuel injection valve 7 is stopped, or fuel is cut off, the electronically controlled throttle valve 10 is operated toward the fully opened side so that pumping loss of the engine 1 due to increase in intake vacuum can be reduced, whereby it is possible to reduce braking force caused by engine brake.

Accordingly, since the kinetic energy of the vehicle can be used for driving the alternator 18, it is possible to further increase the power generation amount of the alternator 18.

In addition, if the control mode of the vehicle is not the fuel-efficiency-oriented control mode in which fuel efficiency is emphasized, or is the driving-oriented control mode in which acceleration performance (kinematic performance) of the vehicle is emphasized, opening of the electrically-operated waste gate valve 13 is adjusted so that the output torque of the engine 1 becomes the required output value calculated by the required output calculation unit 30b.

Thus, the opening of the electrically-operated waste gate valve 13 is adjusted so that the output torque of the engine 1 becomes the required output value even if the vehicle is decelerated. Accordingly, even if a driver operates an accelerator pedal to accelerate the vehicle, for example, it is possible to generate output torque of the engine 1 in response to a request of the driver. As a result, it is possible to prevent driveability from being deteriorated.

The aspect of the present invention is not limited to the present embodiment described above.

For example, in the present embodiment, the engine is a multi-cylinder direct-injection gasoline engine. However, the engine is not limited to the above as a matter of course. It is needless to say that the present invention is applicable to any engines provided with an electrically-operated waste gate valve and an alternator.

In addition, a hybrid vehicle that includes a motor as a power source along with the engine 1 may be also affected by pumping loss of the engine 1 during deceleration. Therefore, the present invention is also applicable to hybrid vehicles.

Further, the device arranged coaxially with the turbine is not limited to a compressor. A generator or a fan may be provided, for example.

EXPLANATION OF REFERENCE SIGNS 1 engine (internal combustion engine)
4 intake passage
5 exhaust passage
5d bypass passage 7 fuel injection valve (fuel supply unit)
8 turbocharger (turbine)
10 electronically controlled throttle valve (intake air amount adjusting unit)
13 electrically-operated waste gate valve (waste gate valve)
18 alternator (rotary electric machine)
21 battery (battery)
22a accelerator position sensor (accelerator opening detection unit)
30 engine control unit
30a power generation amount calculation unit (regenerative power generation amount calculation unit)
30b required output calculation unit
30c fuel cut control unit (second operation control unit)
30d alternator operation control unit
30e waste gate valve operation control unit (first operation control unit)
30f throttle valve operation control unit (second operation control unit)

The invention claimed is:

1. A vehicle, comprising:
an internal combustion engine that is mounted on the vehicle and includes a turbine provided in an exhaust passage;
a waste gate valve that is provided in a bypass passage bypassing the turbine to adjust a flow rate of exhaust gas flowing into the bypass passage;
a rotary electric machine that performs regenerative power generation by using turning force of an axle shaft of the vehicle;
a battery that stores electric power generated by the rotary electric machine;
a processor and a storage device storing instructions that cause the processor to:
determine whether the vehicle is in a decelerated state;
calculate a regenerative power generation amount of the rotary electric machine in response to the decelerated state of the vehicle and an amount of charge of the battery; and
control a first operation of the waste gate valve in response to the regenerative power generation amount.

2. The vehicle according to claim 1, wherein the first operation control step allows the waste gate valve to operate toward its open side in response to the regenerative power generation amount.

3. The vehicle according to claim 2, wherein the regenerative power generation amount calculation step increases the regenerative power generation amount of the rotary electric machine as the amount of charge of the battery decreases, and wherein the first operation control step increases opening of the waste gate valve as the regenerative power generation amount increases.

4. The vehicle according to claim 3, wherein the vehicle further comprising:
an intake air amount adjusting unit that is provided in an intake passage of the internal combustion engine and adjusts the amount of intake air;
an accelerator opening detection unit that detects opening of an accelerator; and
a fuel supply unit that supplies fuel to the internal combustion engine, wherein
the storage device further storing instruction to cause the processor to:
control a second operation of the intake air amount adjusting unit and the fuel supply unit, wherein, when the accelerator opening detection unit detects that the accelerator is turned off, the second operation control unit stops supply of the fuel from the fuel supply unit, as well as allows the intake air amount adjusting step to operate so that opening thereof is set on the open side, and wherein the first operation control unit operates the waste gate valve in accordance with operation of the intake air amount adjusting unit.

5. The vehicle according to claim 4, wherein the first operation control step controls operation of the waste gate valve in response to the regenerative power generation amount calculated by the regenerative power generation amount calculation step in a case where the vehicle is decelerated.

6. The vehicle according to claim 3, wherein the first operation control step controls operation of the waste gate valve in response to the regenerative power generation amount calculated by the regenerative power generation amount calculation step in a case where the vehicle is decelerated.

7. The vehicle according to claim 2, wherein the vehicle further comprising:
an intake air amount adjusting unit that is provided in an intake passage of the internal combustion engine and adjusts the amount of intake air;
an accelerator opening detection unit that detects opening of an accelerator; and
a fuel supply unit that supplies fuel to the internal combustion engine, wherein
the storage device further storing instruction to cause the processor to:
control a second operation of the intake air amount adjusting unit and the fuel supply unit, wherein, when the accelerator opening detection unit detects that the accelerator is turned off, the second operation control unit stops supply of the fuel from the fuel supply unit, as well as allows the intake air amount adjusting unit to operate so that opening thereof is set on the open side, and wherein the first operation control step operates the waste gate valve in accordance with operation of the intake air amount adjusting unit.

8. The vehicle according to claim 7, wherein the first operation control step controls operation of the waste gate valve in response to the regenerative power generation amount calculated by the regenerative power generation amount calculation step in a case where the vehicle is decelerated.

9. The vehicle according to claim 2, wherein the first operation control step controls operation of the waste gate valve in response to the regenerative power generation amount calculated by the regenerative power generation amount calculation step in a case where the vehicle is decelerated.

10. The vehicle according to claim 1, wherein the regenerative power generation amount calculation step increases the regenerative power generation amount of the rotary electric machine as the amount of charge of the battery decreases, and wherein the first operation control step increases opening of the waste gate valve as the regenerative power generation amount increases.

11. The vehicle according to claim 10, wherein the vehicle further comprising:
an intake air amount adjusting unit that is provided in an intake passage of the internal combustion engine and adjusts the amount of intake air;
an accelerator opening detection unit that detects opening of an accelerator; and a fuel supply unit that supplies fuel to the internal combustion engine, wherein
the storage device further storing instruction to cause the processor to:
control a second operation of the intake air amount adjusting unit and the fuel supply unit, wherein, when the accelerator opening detection unit detects that the accelerator is turned off, the second operation control unit stops supply of the fuel from the fuel supply unit, as well as allows the intake air amount adjusting unit to operate so that opening thereof is set on the open side, and wherein the first operation control step operates the waste gate valve in accordance with operation of the intake air amount adjusting unit.

12. The vehicle according to claim 11, wherein the first operation control step controls operation of the waste gate valve in response to the regenerative power generation amount calculated by the regenerative power generation amount calculation step in a case where the vehicle is decelerated.

13. The vehicle according to claim 10, wherein the first operation control step controls operation of the waste gate valve in response to the regenerative power generation amount calculated by the regenerative power generation amount calculation step in a case where the vehicle is decelerated.

14. The vehicle according to claim 1, wherein the vehicle further comprising:
an intake air amount adjusting unit that is provided in an intake passage of the internal combustion engine and adjusts the amount of intake air;
an accelerator opening detection unit that detects opening of an accelerator; and
a fuel supply unit that supplies fuel to the internal combustion engine, wherein
the storage device further storing instruction to cause the processor to:
control a second operation of the intake air amount adjusting unit and the fuel supply unit, wherein, when the accelerator opening detection unit detects that the accelerator is turned off, the second operation control unit stops supply of the fuel from the fuel supply unit, as well as allows the intake air amount adjusting unit to operate so that opening thereof is set on the open side, and wherein the first operation control step operates the waste gate valve in accordance with operation of the intake air amount adjusting unit.

15. The vehicle according to claim 14, wherein the first operation control step controls operation of the waste gate valve in response to the regenerative power generation amount calculated by the regenerative power generation amount calculation step in a case where the vehicle is decelerated.

16. The vehicle according to claim 1, wherein the first operation control step controls operation of the waste gate valve in response to the regenerative power generation amount calculated by the regenerative power generation amount calculation step in a case where the vehicle is decelerated.

17. A vehicle, the vehicle comprising an internal combustion engine that is mounted on the vehicle and includes a turbine provided in an exhaust passage; a waste gate valve that is provided in a bypass passage bypassing the turbine to adjust a flow rate of exhaust gas flowing into the bypass passage; a rotary electric machine that performs regenerative power generation by using turning force of an axle shaft of the vehicle; and a battery that stores electric power generated by the rotary electric machine,
wherein the controller comprises a processor and a storage device storing instructions that causes the processor to:
determine whether the vehicle is in a decelerated state;
calculate a regenerative power generation amount of the rotary electric machine in response to the decelerated state of the vehicle and an amount of charge of the battery, and control a first operation of the waste gate valve in response to the regenerative power generation amount.

18. The vehicle according to claim 17, wherein the first operation control state allows the waste gate valve to operate toward its open side in response to the regenerative power generation amount.

19. The vehicle according to claim 17, wherein the regenerative power generation amount calculation step increases the regenerative power generation amount of the rotary electric machine as the amount of charge of the battery decreases, and wherein the first operation control step increases opening of the waste gate valve as the regenerative power generation amount increases.

20. The vehicle according to claim 17, wherein the vehicle further comprises:
an intake air amount adjusting unit that is provided in an intake passage of the internal combustion engine and adjusts the amount of intake air;
an accelerator opening detection unit that detects opening of an accelerator; and
a fuel supply unit that supplies fuel to the internal combustion engine, wherein
the storage device further storing instruction to cause the processor to:
control a second operation of the intake air amount adjusting unit and the fuel supply unit, wherein, when the accelerator opening detection unit detects that the accelerator is turned off, the second operation control unit stops supply of the fuel from the fuel supply unit, as well as allows the intake air amount adjusting unit to operate so that opening thereof is set on the open side, and wherein the first operation control step operates the waste gate valve in accordance with the operation of the intake air amount adjusting unit.

* * * * *